Patented July 27, 1937

2,088,016

UNITED STATES PATENT OFFICE 2,088,016

PRODUCTION OF NONDECYL OXYGENATED COMPOUNDS

Jacob N. Wickert, Charleston, W. Va., assignor, by mesne assignments, to Union Carbide and Carbon Corporation, a corporation of New York No Drawing. Application May 9, 1934,
Serial No. 724,768

14 Claims. (Cl. 260—134)

The present invention relates to new nondecyl oxygenated compounds. More especially it concerns a secondary nondecyl alcohol and certain sulphate esters thereof, as well as new intermediate products formed in the course of their production. The invention includes a process for the manufacture of these compounds.

The secondary nondecyl alcohol and the sulphate esters thereof possess in high degree those properties adapting them for use as detergents, and as wetting, foaming, emulsifying and impregnating agents in treatment liquors employed in the textile, leather, and other industries.

In the preferred practice of the invention ethylhexaldehyde is condensed with 5-ethylnonene-3-one-2, in the presence of a suitable solution of caustic alkali or its equivalent, at temperatures preferably below 40° C. The ethylnonenone employed need not be pure. For instance, crude reaction mixtures containing it together with more or less of acetone and other condensation products, formed by condensing ethylhexaldehyde and acetone may be used.

The resultant nondecyl ketol is made slightly acid to phenolphthalein by means of a dilute solution of an inorganic acid, such as sulphuric acid. The acidified product is then filtered free from inorganic salts; and the filtrate is distilled under vacuum for the double purpose of dehydrating the ketol to form unsaturated nondecyl ketone, (as the ketol is brought to its boiling point), and for separating from the filtrate the unreacted starting materials and water.

This unsaturated ketone is then hydrogenated, preferably in the liquid phase, under superatmospheric pressures in the range of from 1 to 100 atmospheres, preferably around 700 to 1000 pounds per square inch, and at temperatures within the range of from 20° to 200° C., in the presence of a hydrogenating catalyst such as active nickel, platinum and copper. As the hydrogenation proceeds the corresponding saturated diethylheptyl ketone first is produced; and continued hydrogenation yields the secondary nondecyl alcohol, diethylheptyl carbinol. The reaction mixture is filtered to remove the catalyst, and the filtrate is fractionally distilled under subatmospheric pressure, the fraction containing the nondecyl alcohol being separately recovered.

This alcohol is then reacted with a sulphating agent, such as concentrated sulphuric acid, to produce the hydrogen sulphate ester of nondecyl alcohol, which is then converted into the neutral sulphate ester of the alcohol by treatment with the appropriate base, such as a caustic alkali.

Among bases suitable for the purpose may be mentioned alkaline compounds of the alkali metals and of the alkaline earth metals, and nitrogenous bases such as ammonia, the alkyl amines, and substituted amines such as triethanolamine.

The sodium salt of this nondecyl alcohol is a colorless solid of wax-like consistency. A dilute solution thereof in warm water produces a stable foam and functions readily as a detergent. It is extraordinarily effective in depressing the surface tension of water when dissolved therein in very small proportions.

The process is illustrated by the following examples:

Example 1

To a mixture of 1.7 kg. of unsaturated undecyl ketone (5-ethylnonene-3-one-2) and 2.2 kg. of ethylhexaldehyde,

$C_4H_9CH(C_2H_5)CHO$, there was slowly added with vigorous agitation a methanolic solution containing 50 g. of potassium hydroxide, while maintaining the mixture at a temperature within the range from about 30° to 50° C. The agitation at these temperatures was continued for 16 hours. The reaction mixture was then made slightly acid to phenolphthalein by means of a dilute sulphuric acid solution. The inorganic salts thus formed were filtered off; and the filtrate was distilled under subatmospheric pressure under a bead-packed rectifying column. The doubly unsaturated nondecyl ketone fraction, boiling at from 169° to 173° C. at 6 mm. of mercury absolute pressure, was separately collected. It was a yellow liquid having very little odor, boiled with decomposition at about 315° C. at atmospheric pressure, and had a specific gravity at 20° C. of .871. It apparently has the structure:

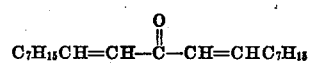

$C_7H_{15}CH=CH-\overset{O}{\overset{\|}{C}}-CH=CHC_7H_{15}$

This doubly unsaturated 19-carbon ketone was charged into a steel bomb mounted upon a shaking device and provided with heating means. To this charge were added 5% of its weight of active nickel catalyst, and the mixture was subjected to the action of hydrogen under 900 pounds per square inch gauge pressure, while maintained at a temperature of about 150° C., until no further hydrogen absorption could be noted. The reaction mixture was then cooled and filtered to remove the catalyst.

The clear filtrate was fractionally distilled under subatmospheric pressure. About 80% of the starting material was thus obtained as diethylheptyl carbinol,—a clear, water-white liquid boiling at 175° to 177° C. at 6 mm. absolute pressure and boiling at 331° C. at atmospheric pressure. It had a specific gravity at 20° C. of .846; an index of refraction $n_D$ 25° C.=1.4547; and an acetyl number of 3.27. It has the apparent structure indicated by the formula:

$(C_4H_9CH(C_2H_5)CH_2CH_2)_2CHOH$, and may be designated at 5, 11 diethylpentadecanol 8.

The symmetrical nondecyl alcohol, diethylheptyl carbinol, may be produced from the unsaturated undecyl ketone in the crude reaction mixture in which it has been formed by the condensation of 2-ethylhexaldehyde and acetone, as indicated in the following example.

Example 2

A mixture of 5 kg. of 2-ethylhexaldehyde and 1 kg. of acetone was maintained at a temperature of about 20° C., while having added thereto slowly 30 g. of potassium hydroxide dissolved in a half liter of methanol, and while vigorously agitating the mixture. The agitation was continued for 26 hours while maintaining the reaction mixture at the said temperature. The specific gravity of the mixture at 20° C. increased from .820 at the start to .883. The mixture was then made slightly acid to phenolphthalein with dilute sulphuric acid, and the inorganic salts that separated were filtered off.

The clear filtrate was distilled under subatmospheric pressure and was stripped of unreacted starting materials such as ethylhexaldehyde, together with some unsaturated undecyl ketone.

The residue was distilled at 6 mm. pressure to give the main fraction boiling at from 169° to 173° C. with some evidence of decomposition. This was the doubly unsaturated 19-carbon ketone, having the apparent structure:

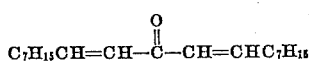

This unsaturated nondecyl ketone was hydrogenated under the general conditions set out in Example 1, supra. The clear filtrate, upon removal of the catalyst from the hydrogenation reaction mixture, was fractionally distilled under subatmospheric pressure. The main fraction boiled at 146° C. at 4 mm. absolute pressure and had a specific gravity at 20° C. of .848. It was free of acid and showed an acetyl number of 3.47. This was the secondary nondecyl alcohol, which may be further purified by fractional distillation in well known manner.

In the usual practice of the invention, the secondary nondecyl alcohol is then sulphated to form nondecyl hydrogen sulphate, having the apparent composition:

$(C_4H_9CH(C_2H_5)CH_2CH_2)_2CHOSO_3H$, the latter of which then may be neutralized with a basic compound, preferably a caustic alkali, yielding the corresponding neutral sulphate ester of nondecyl alcohol, i. e.

$(C_4H_9CH(C_2H_5)CH_2CH_2)_2CHOSO_3Na$

While several known sulphating methods may be employed satisfactorily, particularly high yields are obtained by reacting the nondecyl alcohol with chlorosulphonic acid dissolved in dichlorethyl ether, as illustrated by the following example:

Example 3

A solution of 12.5 g. of chlorosulphonic acid in 30 g. of dichlorethyl ether was added during 15 minutes to a solution of 30.6 g. of the nondecyl alcohol in 140 g. dichlorethyl ether, with constant stirring which was continued for an additional 20 minutes. The temperature was maintained at about 0° C. during the reaction, and 22 liters of dry nitrogen were blown through the mixture during this period. The reaction mixture was then neutralized with 1 N. aqueous caustic soda solution, and an additional 1500 g. of water was added to extract the sulphate ester from the dichlorethyl ether. One gram of sodium bicarbonate may be added to this aqueous extract, for the purposes hereinafter described.

The aqueous solution of the sulphate ester was then evaporated to dryness under a subatmospheric pressure of less than 100 mm. absolute, by dropping it slowly into a vessel held at 60° C. When no more water was thus removable, the residue was dissolved in methanol and filtered to remove inorganic impurities. The filtrate was then evaporated to dryness at temperatures within the range from —2 to +22° C., leaving the neutral sulphate ester in the form of a nearly white waxy solid.

The addition of a small amount up to 2% of sodium carbonate, bicarbonate or other mild alkaline compound to the above-mentioned aqueous solution prior to its evaporation reduces any tendency toward decomposition and discoloration of the sulphate ester when heated above 50° C. during the drying operation.

Concentrated sulphuric acid conveniently can be used in the sulphating step, as indicated hereinbelow, with or without the addition thereto of acetic anhydride or other anhydride.

Example 4

6 mols of concentrated sulphuric acid were gradually poured into a body of 6 mols of acetic anhydride while vigorously stirring the mixture, and while keeping the temperature of the latter between 10° and 15° C. To this mixture was added 3.2 mols of the nondecyl alcohol, drop by drop, while maintaining the temperature between 5° and 10° C. The mixture was agitated during the addition of the alcohol and thereafter until the product was completely soluble in water.

The reaction mixture was then poured upon cracked ice, and the diluted product was nearly neutralized with a 25% aqueous solution of caustic soda. The mixture then was made slightly alkaline to phenolphthalein by use of solid sodium carbonate. Upon standing a few hours a light froth of soaplike consistency separated and was purified separately. The aqueous layer was evaporated to dryness under reduced pressure, and the residue was extracted with methanol. The insoluble sodium sulphate was filtered off; and the methanol solution was diluted with one-half its volume of water and extracted twice with 15% of its volume of hexane,—or similar petroleum hydrocarbon. The upper, hydrocarbon layer was then evaporated to dryness under vacuum, leaving the sodium nondecyl sulphate as a residue. The light froth was purified in the same manner as the residue from the said aqueous layer.

The sodium sulphate ester of diethylheptyl carbinol is a nearly white waxy solid, somewhat soluble in water and in methanol. A voluminous stable foam is produced when a dilute aqueous solution thereof is shaken. The calcium and magnesium salts present in moderately hard waters are not precipitated by the sulphate ester of diethylheptyl carbinol, since the latter's calcium and magnesium salts are almost as soluble as the sodium salt. A dilute aqueous solution of the sodium salt is highly effective as a detergent for washing cloth, and for removing grease, dirt, and fresh oil paint from the person.

The power of depressing the interfacial tension between water and hydrocarbons is one of the properties possessed to a remarkable degree by the alkali sulphates of the nondecyl alcohol. Evaluation of this power is obtained by drop-number measurements. These consist in counting the number of drops formed by a plane-ground capillary tip when a fixed volume (for convenience about 10 c. c.) of an aqueous solution containing .25% by weight of the sample to be evaluated is allowed to flow slowly into a body of kerosene at a fixed temperature, for example 30° C. The tip is of such size that,—when water is employed as the standard of comparison,—the said fixed volume of water will be divided into a selected number of drops, preferably about 25 drops. The rate of flow is so regulated that the drops will form distinctly and can be counted conveniently. It is known that the depression of the interfacial tension by the respective samples is related to the detergent and particularly to the emulsifying powers of the latter. This depressing power is measured directly by the number of drops formed.

Drop number tests were made on some commonly used soaps and detergent powders, and also upon the sodium nondecyl sulphates of the present invention, the tests being made upon .25% aqueous solutions of the respective materials flowing into kerosene at 30° C. The distilled water used as the standard had a drop number of 22; the drop numbers for six nationally-known soaps and detergent powders ranged from 75 to 184; and the drop numbers of sodium nondecyl sulphate of the present invention measured under similar conditions was over 1000, ranging from 1530 to 7650 in specific instances, depending upon such factors as the degree of purity of the products.

Other volatile inert diluents for the unsaturated undecyl ketone and ethylhexaldehyde, such as ethanol, can be substituted for the methanol in the ketol-forming reaction. The use of such diluent is desirable but is not essential.

The invention is susceptible of modification within the scope of the appended claims.

I claim:

1. A chemical compound identical with that resulting from the condensation of 2-ethylhexaldehyde and 5-ethylnonene-3-one-2, the said compound readily losing the elements of water to form an unsaturated ketone, and having the formula:

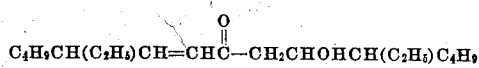

2. A chemical compound identical with that resulting from the removal of the elements of water from the primary product formed by the condensation of 2-ethylhexaldehyde and 5-ethylnonene-3-one-2, the same being an unsaturated nondecyl ketone boiling at from 169° to 173° C. at 6 mm. of mercury absolute pressure, and having a specific gravity at 20° C. of .871.

3. As a new chemical compound, an unsaturated nondecyl ketone boiling at from 169° to 173° C. at 6 mm. of mercury absolute pressure, and boiling with decomposition at about 315° C. at atmospheric pressure, the said compound being a yellow liquid having a specific gravity at 20° C. of .871, and having the formula:

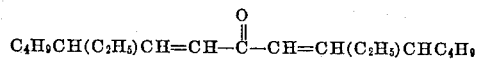

4. A chemical compound identical with that resulting from the hydrogenation of the unsaturated ketone formed by removal of the elements of water from the condensation product of 2-ethylhexaldehyde and 5-ethylnonene-3-one-2, the said compound being diethylheptyl ketone, having the formula:

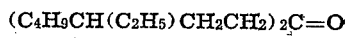

5. As a chemical compound, diethylheptyl carbinol, the same being a clear liquid boiling at from 175° to 177° C. at 6 mm. of mercury absolute pressure, and having a specific gravity at 20° C. of .846, and an index of refraction $n/D/25°$ C.$=1.4547$.

6. As a chemical compound, diethylheptyl carbinol, the same being a liquid boiling at from 175° to 177° C. at 6 mm. of mercury absolute pressure, and at 331° C. at atmospheric pressure, and apparently having the composition indicated by the designation: 5,11-diethylpentadecanol-8.

7. In the process of making an unsaturated nondecyl ketone, the steps of condensing ethylhexaldehyde and a ketone selected from the group consisting of acetone and 5-ethylnonene-3-one-2, in the presence of an alkali, slightly acidifying the resultant reaction mixture, and heating the acidified mixture.

8. The process of making a nondecyl secondary alcohol, which comprises condensing ethylhexaldehyde and a ketone selected from the group consisting of acetone and 5-ethylnonene-3-one-2, in the presence of an alkali, removing the elements of water from the resultant ketol to form an unsaturated ketone, and hydrogenating the latter.

9. The process of making diethylheptyl carbinol, which comprises condensing ethylhexaldehyde and ethylnonenone in the presence of an organic diluent and of an alkali, removing the elements of water from the ketol thus produced, thereby forming an unsaturated ketone boiling at from 169° to 173° C. under 6 mm. of mercury absolute pressure, and hydrogenating the latter under superatmospheric pressure at temperatures up to 200° C., in the presence of a hydrogenating catalyst.

10. The process of making diethylheptyl carbinol, which comprises condensing ethylhexaldehyde and ethylnonenone in the presence of an organic diluent and of an alkali, removing the elements of water from the ketol thus produced, thereby forming an unsaturated ketone boiling at from 169° to 173° C. under 6 mm. of mercury absolute pressure, and hydrogenating the latter under superatmospheric pressure at temperatures up to 150° C., in the presence of active nickel.

11. In the process of making a nondecyl oxygenated compound, the steps which comprise condensing 2-ethylhexaldehyde and a ketone selected from the group consisting of acetone and 5-ethylnonene-3-one-2 in the presence of an alkaline compound, slightly acidifying the resultant reaction mixture, fractionally distilling the acidified mixture under subatmospheric pressure, and separately recovering the fraction boiling at from 169° to 173° C. at 6 mm. of mercury absolute pressure.

12. In the process of making a nondecyl oxygenated compound, the steps which comprise condensing 2-ethylhexaldehyde and a ketone selected from the group consisting of acetone and 5-ethylnonene-3-one-2 in the presence of an alkaline compound, slightly acidifying the resultant reaction mixture, fractionally distilling the acidified mixture under subatmospheric pressure, separately recovering the unsaturated nondecyl ketone fraction boiling at from 169° to 173° C. at 6 mm. of mercury absolute pressure, and hydrogenating the said fraction at pressures of from 1 to 100 atmospheres and at temperatures of from 20° to 200° C., in the presence of a hydrogenation catalyst.

13. The process of making an unsaturated nondecyl ketone, which comprises condensing 2-ethylhexaldehyde and a ketone selected from the group consisting of acetone and 5-ethylnonene-3-one-2, in the presence of an alkali, and removing elements of water from the resultant ketol.

14. The process of making diethylheptyl carbinol, which comprises condensing 2-ethylhexaldehyde and a ketone selected from the group consisting of acetone and 5-ethylnonene-3-one-2, in the presence of an alkali, removing the elements of water from the ketol thus produced, thereby forming an unsaturated ketone, and hydrogenating the latter under superatmospheric pressure at temperatures up to 200° C., in the presence of a hydrogenating catalyst.

JACOB N. WICKERT.